(12) United States Patent
Huang et al.

(10) Patent No.: US 9,444,779 B2
(45) Date of Patent: Sep. 13, 2016

(54) DYNAMIC AND INTELLIGENT DNS ROUTING WITH SUBZONES

(75) Inventors: Lin Huang, Redmond, WA (US);
Santosh Daddi, Bothell, WA (US);
John F. Wohlfert, Everett, WA (US);
Rui Chen, Bellevue, WA (US);
Rodrigo Junqueira Lode, Seattle, WA (US); Rangaprasad Narasimhan, Sammamish, WA (US)

(73) Assignee: Microsoft Technology Lincensing, LLC, Redmond, WA (US)

( * ) Notice: Subject to any disclaimer, the term of this patent is extended or adjusted under 35 U.S.C. 154(b) by 139 days.

(21) Appl. No.: 13/487,820

(22) Filed: Jun. 4, 2012

(65) Prior Publication Data

US 2013/0326084 A1     Dec. 5, 2013

(51) Int. Cl.
*G06F 15/173* (2006.01)
*H04L 29/12* (2006.01)

(52) U.S. Cl.
CPC ......... *H04L 61/1511* (2013.01); *H04L 61/609* (2013.01); *H04L 61/1564* (2013.01)

(58) Field of Classification Search
CPC .......................... G06F 15/173; H04L 61/1511
USPC ....................................................... 709/238
See application file for complete search history.

(56) References Cited

U.S. PATENT DOCUMENTS

| | | | |
|---|---|---|---|
| 6,154,777 A * | 11/2000 | Ebrahim | H04L 29/12066 709/227 |
| 6,769,031 B1 | 7/2004 | Bero | |
| 6,834,302 B1 | 12/2004 | Harvell | |
| 6,976,090 B2 * | 12/2005 | Ben-Shaul et al. | 709/246 |
| 7,099,957 B2 * | 8/2006 | Cheline | H04L 29/12066 709/245 |
| 7,228,359 B1 * | 6/2007 | Monteiro | 709/245 |
| 7,337,910 B2 * | 3/2008 | Cartmell et al. | 209/245 |

(Continued)

FOREIGN PATENT DOCUMENTS

| | | |
|---|---|---|
| CN | 102216923 A | 10/2011 |
| CN | 102439913 A | 5/2012 |
| EP | 0817444 A2 | 1/1998 |

OTHER PUBLICATIONS

"Upgrade Domain Controllers: Microsoft Support Quick Start for Adding Windows Server 2008 or Windows Server 2008 R2 Domain Controllers to Existing Domains", Retrieved on: Jan. 17, 2012, Available at: http://technet.microsoft.com/en-us/library/upgrade-domain-controllers-to-windows-server-2008-r2%28WS.10%29.aspx.

(Continued)

*Primary Examiner* — Joseph E Avellino
*Assistant Examiner* — Binod J Kunwar
(74) *Attorney, Agent, or Firm* — Damon Rieth; Tom Wong; Micky Minhas

(57) ABSTRACT

A request to resolve an IP address is received by a Domain Name Server (DNS). A record, such as an MX record, relating to the request is obtained that comprises a unique label (e.g. record=customer-com.mail.messaging.com) that is used in determining how to resolve the request. The unique label portion of the record (e.g. customer-com) is used to identify information relating to the request such as a version of software/service to use to handle the request, a region used to handle the request, and the like. The same record may be used to direct a request to a different version and/or different region. For example, without changing the record, a request at one time may access a first version/region and a request at a different time access a different version/region.

18 Claims, 7 Drawing Sheets

(56) References Cited

U.S. PATENT DOCUMENTS

| | | | |
|---|---|---|---|
| 7,363,361 B2* | 4/2008 | Tewari et al. ................. 709/223 |
| 7,478,148 B2* | 1/2009 | Neerdaels ............... H04L 29/06 709/223 |
| 7,526,562 B1* | 4/2009 | Samprathi ......... H04L 29/12066 370/466 |
| 7,707,314 B2* | 4/2010 | McCarthy ......... H04L 29/12066 709/217 |
| 7,725,602 B2* | 5/2010 | Liu .................. H04L 29/12066 709/217 |
| 7,792,989 B2* | 9/2010 | Toebes ................ H04L 67/1021 709/223 |
| 7,840,699 B2* | 11/2010 | Fujita ..................... H04L 29/06 709/238 |
| 7,877,510 B2* | 1/2011 | Datta ................ H04L 29/12066 709/203 |
| 7,962,569 B2* | 6/2011 | Sewall et al. ................. 709/217 |
| 7,991,910 B2* | 8/2011 | Richardson ....... H04L 29/12066 709/203 |
| 8,028,091 B1* | 9/2011 | Kleinfelter ........ H04L 29/12066 709/204 |
| 8,321,588 B2* | 11/2012 | Richardson ....... H04L 29/12066 709/203 |
| 8,386,596 B2* | 2/2013 | Richardson et al. ......... 709/223 |
| 8,438,263 B2* | 5/2013 | Sivasubramanian ... H04L 67/20 709/203 |
| 8,452,874 B2* | 5/2013 | MacCarthaigh .. H04L 29/08288 709/222 |
| 8,458,250 B2* | 6/2013 | Sivasubramanian H04L 29/12132 709/203 |
| 8,510,428 B2* | 8/2013 | Joshi ................ H04L 29/12792 709/203 |
| 8,788,475 B2* | 7/2014 | Fredricksen ...... G06F 17/30011 707/689 |
| 8,812,651 B1* | 8/2014 | Eriksen ................. H04L 45/745 709/224 |
| 8,949,398 B2* | 2/2015 | Falkena ............ H04L 29/12594 709/223 |
| 9,191,458 B2* | 11/2015 | Richardson ......... H04L 67/2814 |
| 2002/0010767 A1 | 1/2002 | Farrow et al. |
| 2002/0138649 A1 | 9/2002 | Cartmell et al. |
| 2004/0006597 A1* | 1/2004 | Hughes ............... H04L 29/1215 709/206 |
| 2004/0215707 A1 | 10/2004 | Fujita |
| 2005/0198159 A1* | 9/2005 | Kirsch .......................... 709/206 |
| 2005/0204064 A1* | 9/2005 | Ruiz ..................... H04L 61/609 709/245 |
| 2006/0174033 A1* | 8/2006 | Gillum ................ H04L 12/5855 709/238 |
| 2007/0124487 A1* | 5/2007 | Yoshimoto ........ H04L 29/12066 709/230 |
| 2007/0150611 A1* | 6/2007 | Chan et al. .................... 709/230 |
| 2008/0215718 A1* | 9/2008 | Stolorz et al. ................. 709/223 |
| 2009/0187632 A1 | 7/2009 | Alarid et al. |
| 2009/0204711 A1* | 8/2009 | Binyamin ............... H04L 67/16 709/226 |
| 2010/0299409 A1 | 11/2010 | Cartmell et al. |
| 2010/0312914 A1* | 12/2010 | Katis et al. .................... 709/238 |
| 2011/0029599 A1 | 2/2011 | Pulleyn et al. |
| 2011/0145386 A1* | 6/2011 | Stolorz et al. ................. 709/223 |
| 2013/0067530 A1* | 3/2013 | Spektor et al. .................... 726/1 |
| 2013/0212200 A1* | 8/2013 | Dennis et al. ................. 709/206 |
| 2013/0212240 A1* | 8/2013 | Thornewell ......... H04L 61/1511 709/223 |

OTHER PUBLICATIONS

"DNS Zone", Retrieved on: Jan. 17, 2012, Available at: http://en.wikipedia.org/wiki/DNS_zone.

International Search Report mailed Sep. 5, 2013, issued in PCT/US2013/042792.

"How DNS query works", 1-10 Microsoft TechNet Library, Jan. 21, 2005, pp. 1-5, XP0550n093, Retrieved from the Internet: URL:http://technet.microsoft.com/en-us/library/cc775637%28v=ws.10%29.aspx; [retrieved on Aug. 29, 2013] Part 2.

"First Office Action and Search Report Issued in Chinese Patent Application No. 201310216570.X", Mailed Date: Nov. 5, 2015, 13 Pages.

* cited by examiner

DYNAMIC AND INTELLIGENT DNS ROUTING WITH SUBZONES

BACKGROUND

A mail exchanger record (MX record) is a resource record that is used to specify a mail server that is responsible for handling electronic messages for a recipient's domain. The MX record specifies the fully qualified domain name of a mail host and may include a preference value. The sending server queries the Domain Name System (DNS) for MX records for each of the domain names for the recipients of the message. In response, one or more host names that accept messages for that domain are returned. The sending server uses the list to establish a connection and send the message. In order to change the mail server used by a recipient, the MX is updated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A request to resolve an IP address is received by a Domain Name Server (DNS). A record, such as an MX record, relating to the request is obtained that comprises a unique label (e.g. record=customer-com.mail.messaging.com) that is used in determining how to resolve the request. The unique label portion of the record (e.g. customer-com) is used to identify information relating to the request such as a version of software/service to use to handle the request, a region used to handle the request, and the like. The same record may be used to direct a request to a different version and/or different region. For example, without changing the record, a request at one time may access a first version/region and at a different time access a different version/region. Instead of having customers change the record each time a different version of software is to be used, the unique label may be used to determine the correct version of the software for which to direct the request. The unique label may also be used to direct the request to a specific region (e.g. a European user is directed to a European IP address whereas a US user is directed to a US IP address).

DETAILED DESCRIPTION

Figure 1:
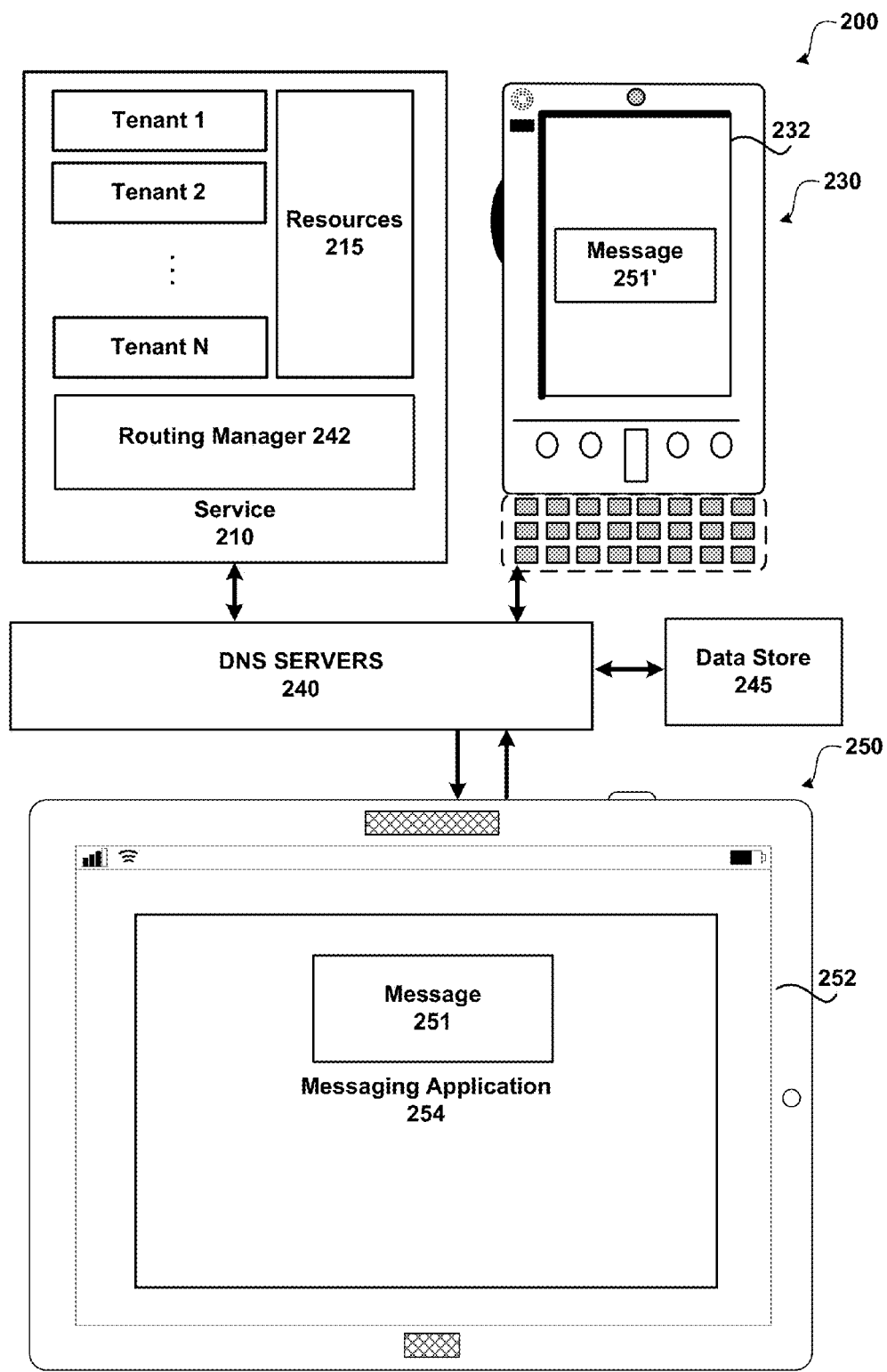
FIG. 1 illustrates an exemplary system for routing a request using a unique label.

Referring now to the drawings, in which like numerals represent like elements, various embodiments will be described.

FIG. 1 illustrates an exemplary system for routing a request using a unique label. As illustrated, system 200 includes service 210, DNS servers 240, data store 245, touch screen input device/display 250 (e.g. slate) and smart phone 230.

As illustrated, service 210 is a cloud based and/or enterprise based service that may be configured to provide services (e.g. MICROSOFT FOREFRONT, MICROSOFT OFFICE 365 or some other cloud based/online service that is used to interact with items (e.g. messages, spreadsheets, documents, charts, and the like). Functionality of one or more of the services/applications provided by service 210 may also be configured as a client/server based application. For example, a client device may include a messaging application that performs operations relating to selecting items using touch input. A server application may be configured to provide services relating to electronic messages (e.g. MICROSOFT FOREFRONT, EXCHANGE). Although system 200 shows a service relating to messaging, other services/applications may be configured to route requests using a unique label that is determined from a record, such as a Mail Exchanger (MX) record. As illustrated, service 210 is a multi-tenant service that provides resources 215 and services to any number of tenants (e.g. Tenants 1-N). Multi-tenant service 210 is a cloud based service that provides resources/services 215 to tenants subscribed to the service and maintains each tenant's data separately and protected from other tenant data. Service 201 may include an Authoritive DNS service.

System 200 as illustrated comprises a touch screen input device/display 250 (e.g. a slate/tablet device) and smart phone 230 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

As illustrated, touch screen input device/display 250 and smart phone 230 shows exemplary displays 252/232 showing sending/receiving of an electronic message (251, 251'). For example, a user associated with slate 250 may desire to send message 251 to a user associated with smartphone 230. Documents may be stored on a device (e.g. smart phone 230, slate 250 and/or at some other location (e.g. network data store 245).

Smart phone 230 shows a display 232 of a message 251. Slate 250 shows a display 252 of a messaging application 254 sending message 251 to smart phone 230. The messaging application 254 may be a client based application, a server based application, a cloud based application and/or some combination.

DNS servers 240 are configured to provide DNS services. DNS servers 240 is used to represent the different DNS's that are associated with a customer DNS, a service DNS, a local DNS, and the like (See FIG. 2 and related discussion for more detail).

Routing manager 242 (DNS++) is configured to perform operations relating to routing a request using information that is identified by a record that is associated with the entity issuing the request to resolve an IP address. For example, message 251 may be addressed to user@customer.com. A request to resolve the address is received by Domain Name Servers (DNS) 240. An exemplary record, such as an MX record, relating to the request is obtained that comprises a unique label (e.g. record=customer-com.mail.messaging. com) that is used in determining how to resolve the request. The unique label portion of the record (e.g. customer-com) is used by routing manager 242 to identify information relating to the request such as a version of software/service to use to handle the request, a region used to handle the request, a subzone, and the like. The same record may be used to direct a request to a different version and/or different region. For example, without changing the record, a request at one time may access a first version/region and a request at a different time may access a different version/region. Instead of having customers change the record (e.g. MX record) each time a different version of software is to be used, the unique label may be used to determine the correct version of the software for which to direct the request. The unique label may also be used to direct the request to a specific region (e.g. a user located in the Western part of the US is directed to a Western US IP address whereas an Eastern user is directed to an Eastern US IP address). Routing manager 242 may be configured to use the unique label to route to any number of zones/subzones.

Figure 2:
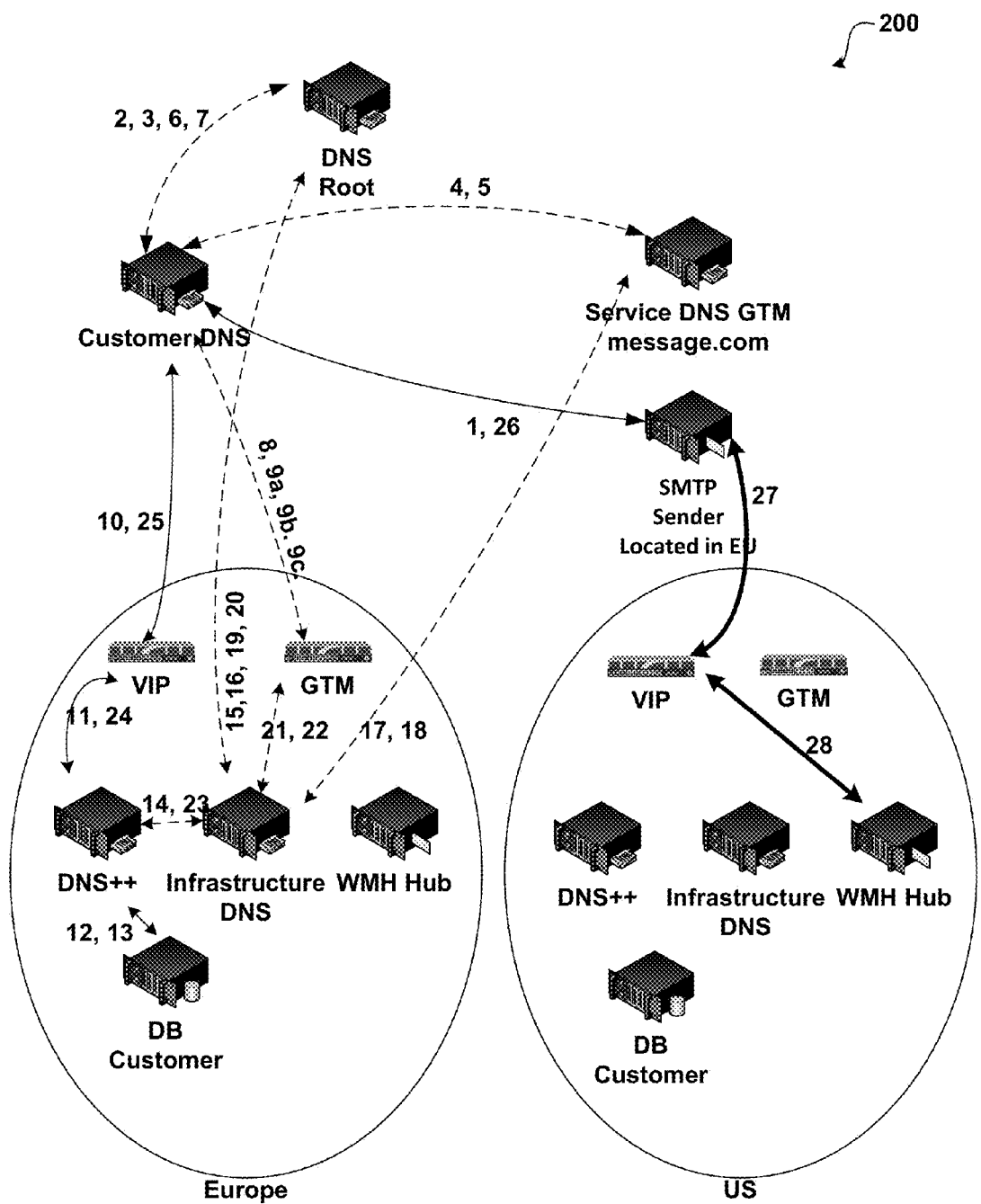
FIG. 2 illustrates an example flow for resolving a request using a unique identifier associated with a resource record.

FIG. 2 illustrates an example flow for resolving a request using a unique identifier associated with a resource record.

Initially at step 1, an entity (e.g. identified by contoso-com) sends a request for a customer MX record and/or an A record request from the customer DNS associated with the sender's SMTP server to their DNS server (e.g. contoso-com.mail.messaging.com).

Moving to step 2, the customer DNS server queries the DNS Root for the messaging.com GLUE records when the GLUE records are not already cached.

Flowing to step 3, the DNS Root delivers the GLUE records for messaging.com IPs to the Customer DNS server.

Transitioning to step 4, the customer DNS server queries the messaging.com server (Service GTM) for the A record for contoso-com.mail.beta.messaging.com.

Moving to step 5, the Service GTM server is the Start of Authority (SOA) for messaging.com but is not authoritative for the zone mail.messaging.com so it returns an NS record including the FQDN (Fully Qualified Domain Name) ns-bm.filtering.com to the customer DNS server.

Flowing to step 6, the customer DNS server obtains the GLUE records (if not already cached) for filtering.com from the DNS root.

Moving to step 7, the DNS Root delivers the GLUE records for filtering.com IPs to the Customer DNS server.

Transitioning to step 8, the Customer DNS server sends a request for contoso-com.mail.messaging.com to the service's Global Traffic Manger (GTM).

Moving to step 9a, the GTM returns an NS record of ns-bd.filtering.com to the customer DNS server.

At step 9b, the Customer DNS server queries the GTM to resolve ns-bd.filtering.com.

At step 9c, the GTM returns a geo load-balanced IP for the nearest DNS++ Server (e.g. Routing Manager 242 as illustrated in FIG. 2). According to an embodiment, the DNS++ server comprises the functionality for using the unique label that is associated with the record for determining a version of the software and/or a region to which to direct the request. The functionality may be included in other locations. For example, the functionality may be included within another DNS (e.g. the main service DNS) and/or some other server.

Flowing to step 10, the Customer DNS server queries DNS++ VIP for the A record contoso-com.mail.messaging.com Moving to step 11, the VIP connects to the DNS++ server.

Transitioning to step 12, the DNS++ server lookups up customer version and regional information based on unique identifier "contoso-com" Flowing to step 13, the customer DB server returns "version2" for the version and "NA" (e.g. North America) for the region.

Moving to step 14, the DNS++ server creates the FQDN to query (NA_version15.dns.messaging.com) and queries a local DNS server (if not already cached).

Transitioning to step 15, the local infrastructure DNS server (if not already cached) queries the DNS Root for the messaging.com GLUE records.

Flowing to step 16, the DNS Root delivers the GLUE records for messaging.com IPs to the Local Infrastructure DNS server.

Moving to step 17, the Local Infrastructure DNS server queries the Service DNS for NA_version15.dns.messaging.com Transitioning to step 18, the Service DNS returns the NS record for GTM ns-bd.filtering.com Flowing to step 19, the Local Infrastructure DNS server queries the Root DNS for filtering.com NS server.

Moving to step 20, the DNS Root delivers GLUE records for filtering.com to the Local DNS server.

Transitioning to step 21, the Local DNS server sends request for IP for SOA for ns-bd which is returned with the request for NA_version15.dns.messaging.com to the service GTM.

Flowing to step 22, the GTM returns the geo load-balanced VIP for nearest version and region SMTP VIP to the Local DNS server.

Moving to step 23, the Local DNS server delivers IP for NA_version15.dns.mesaging.com to the DNS++ server.

Transitioning to steps 24-25, the DNS++ server sends IP Customer DNS server via the VIP.

Moving to step 26, the Customer DNS server sends IP to the SMTP Sender.

Transitioning to steps 27-28, the SMTP Sender establishes a session with nearest region/version specific SMTP server via the VIP and delivers the message.

Figure 3:
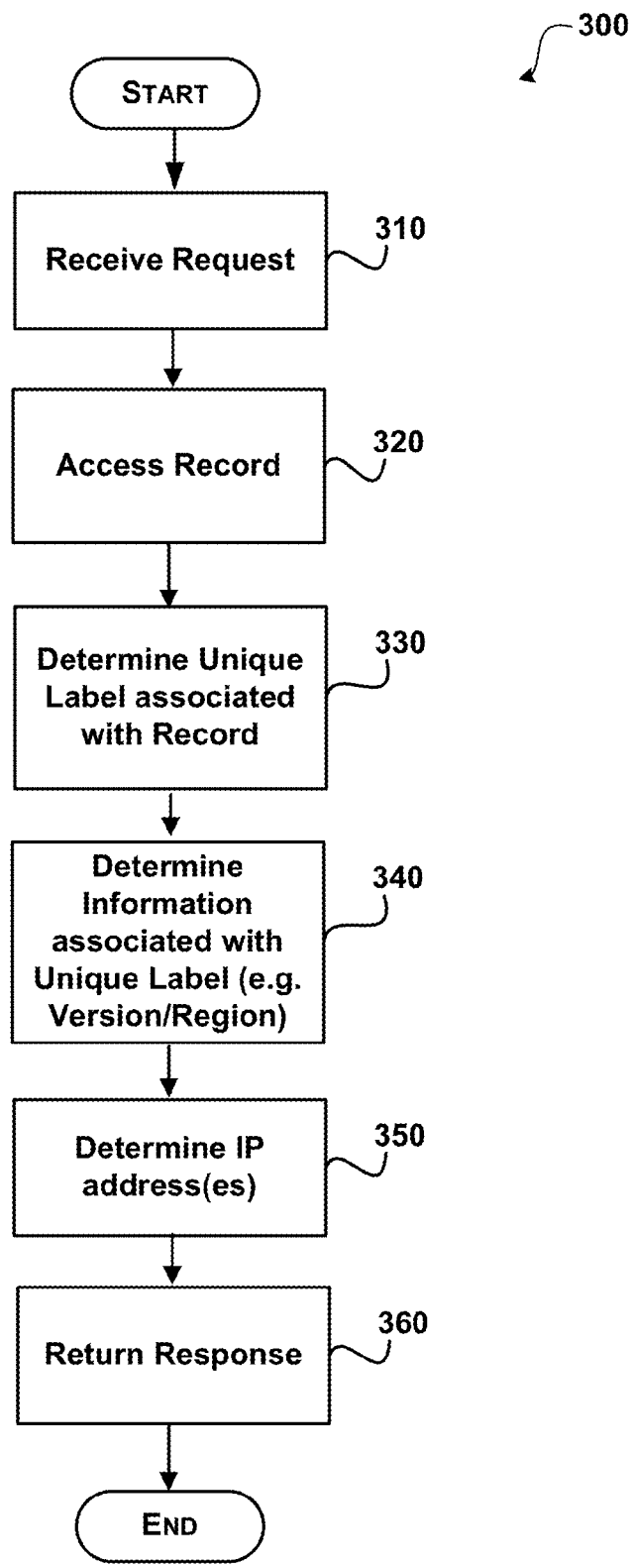
FIG. 3 shows an illustrative process for intelligent and dynamic DNS routing.

FIG. 3 shows an illustrative process for intelligent and dynamic DNS routing. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 300 flows to operation 310, where a request is received for an IP address.

Moving to operation 320, a record that is associated with the request. According to an embodiment, the record is an MX record that includes a unique identifier that identifies a user/customer that is associated with the request. For example, the unique identifier may be a name of a company/user and/or some other identifier that is associated with the user/customer.

Transitioning to operation 330, the unique label is identified/determined from the accessed record. For example, the unique label may be at the start of the record (e.g. customer in customer.mail.messaging.com) or in another location within the record (e.g. mail.entity.messaging.com where entity is the unique label). According to another embodiment, the unique label may be determined from an identifier that is included within the record. For example, the record may include a reference to an external location that stores the unique label (e.g. 1zx.mail.messaging.com where the 1zx is used to access the unique label information in an external location).

Flowing to operation 340, the determined label is used to obtain information that is associated with the request. According to an embodiment, the label is used to determine a current version of software that is associated with the requestor and the geographic region that is associated with the request.

Moving to operation 350, the IP address(es) is determined based on the additional information determined from the unique label.

Transitioning to operation 340, the response is returned including the determined IP address(es).

The process then moves to an end operation and returns to processing other actions.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
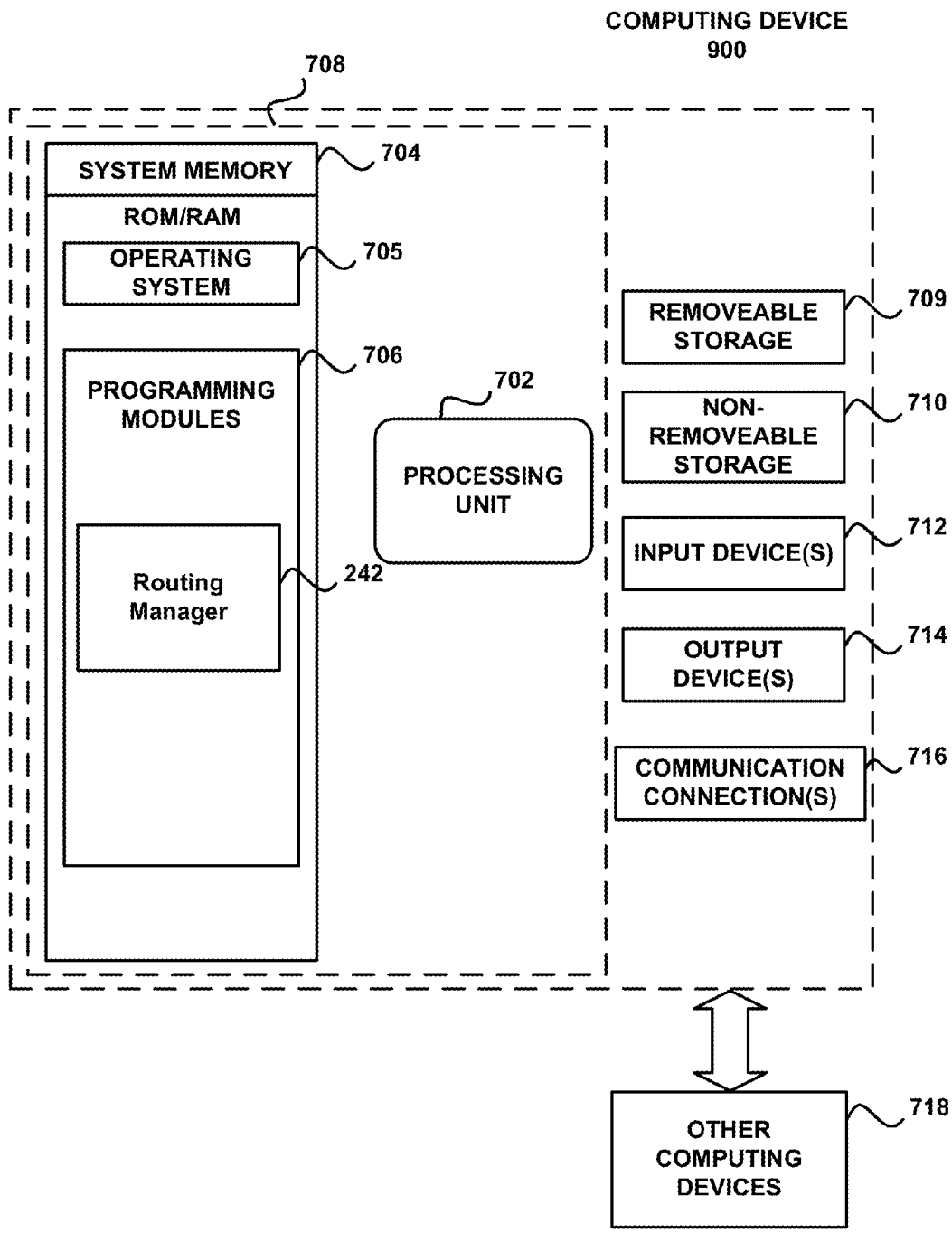
FIGS. 4-6 and the associated descriptions provide a discussion of a variety of operating environments in which embodiments of the invention may be practiced.
Figure 5A:
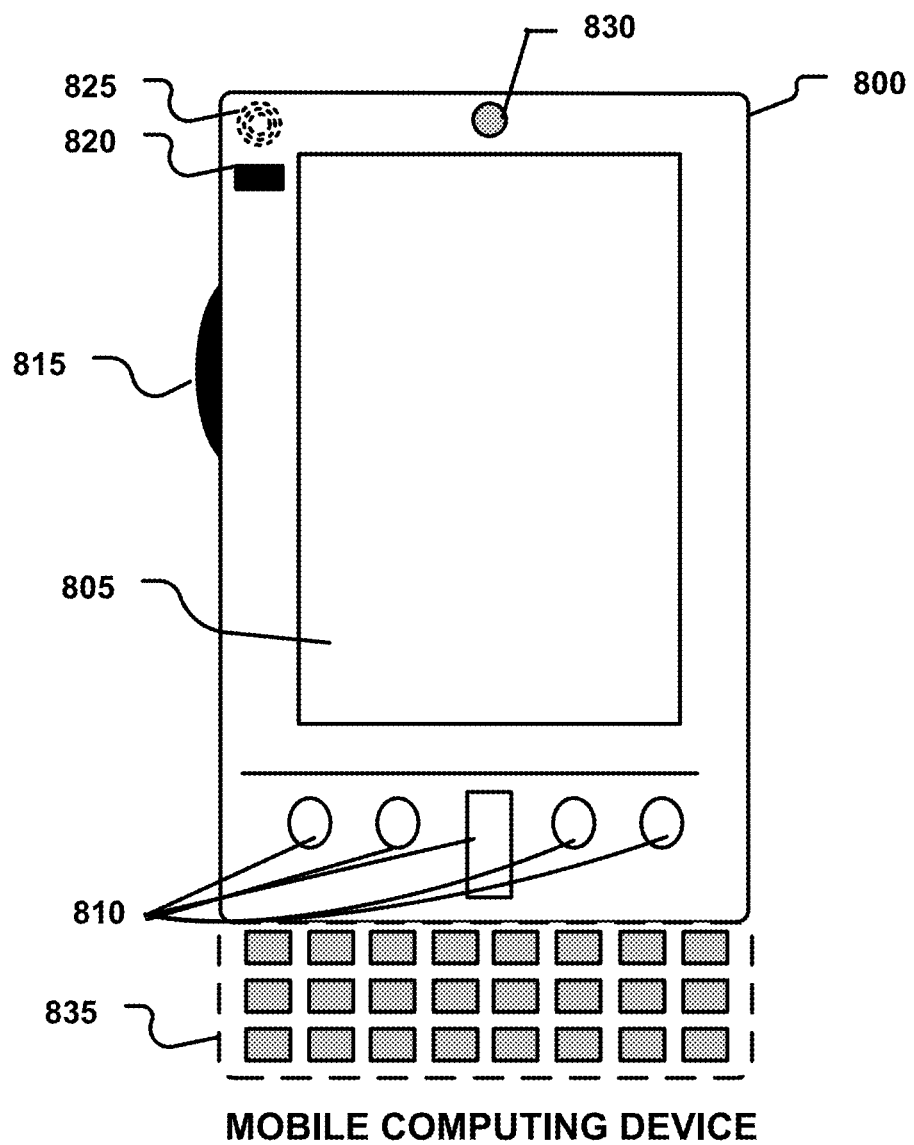
Figure 5B:
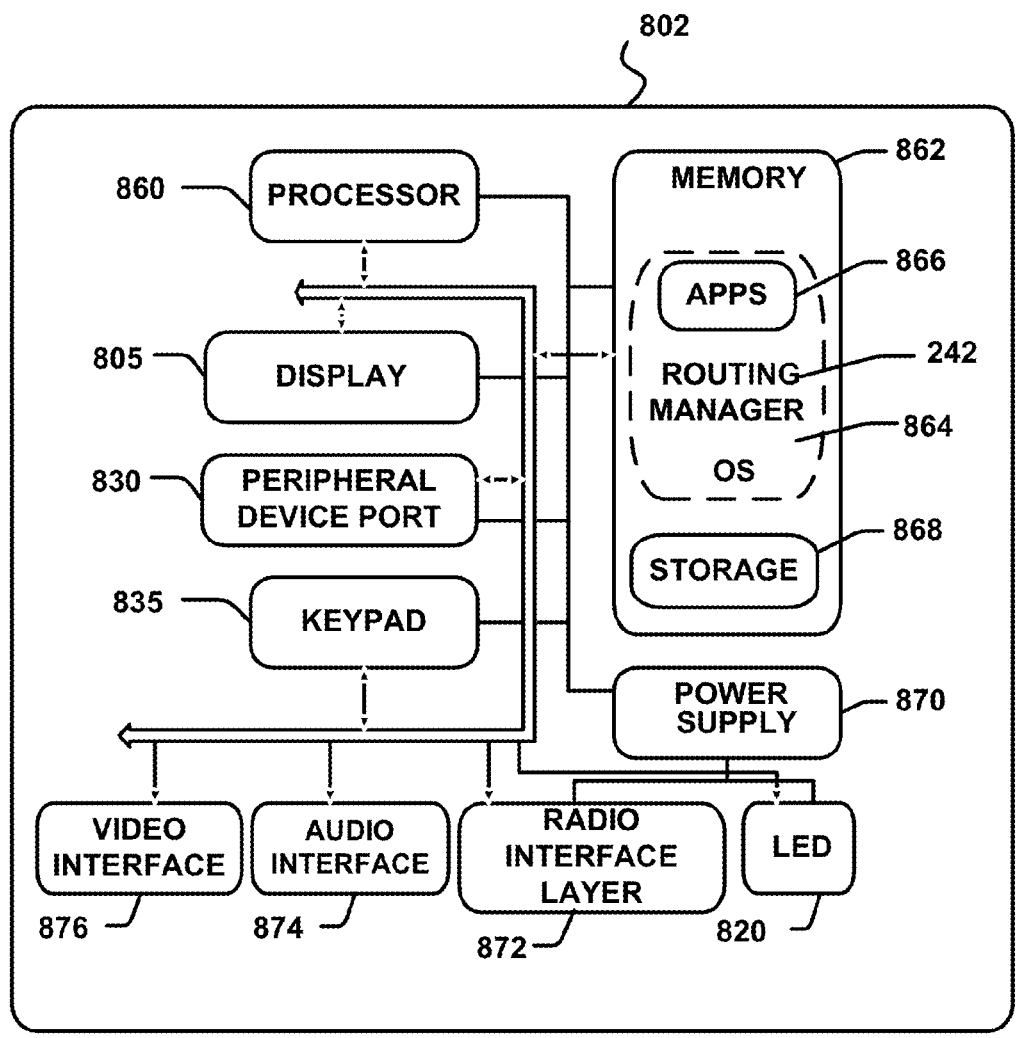
Figure 6:
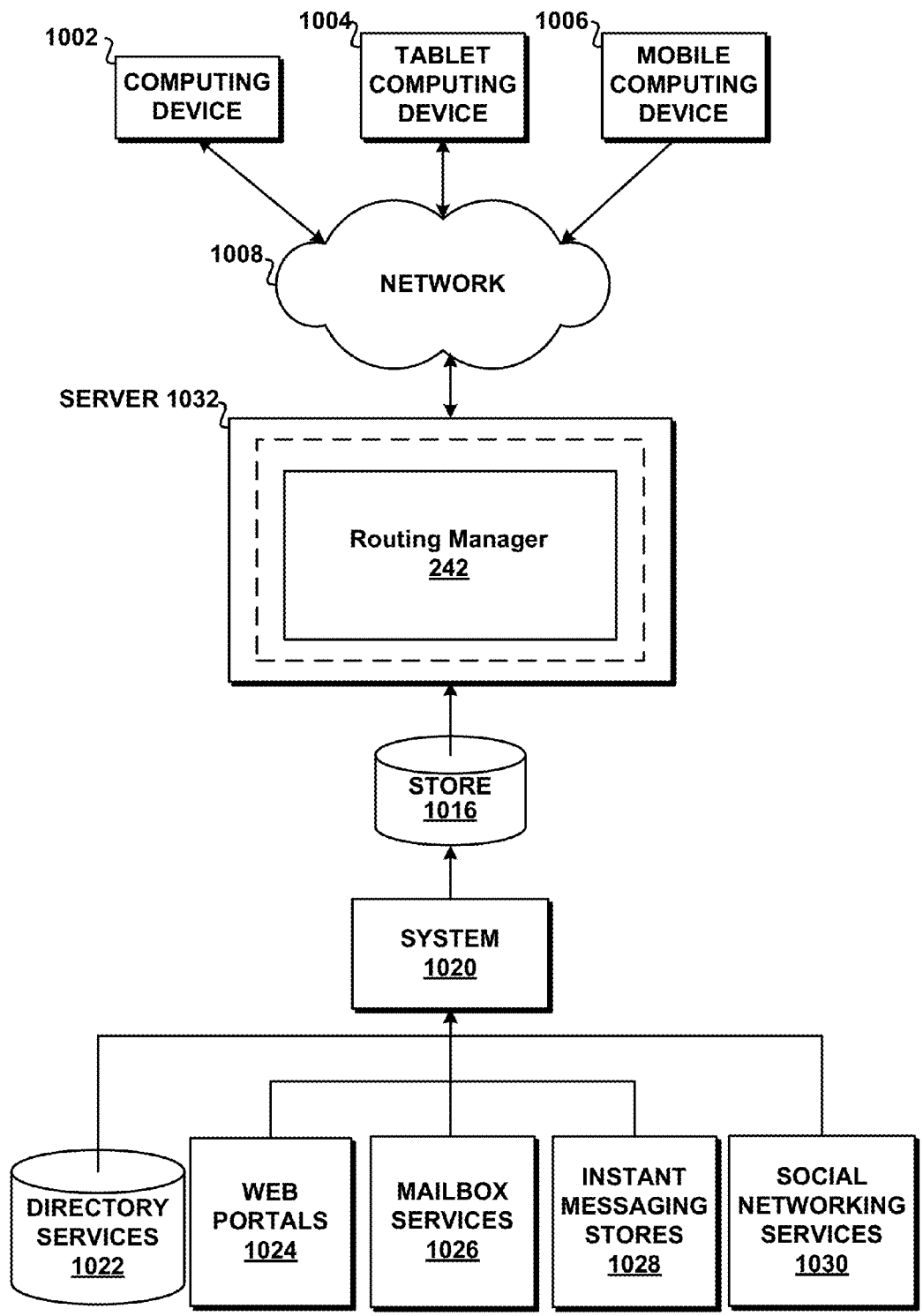

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating example physical components of a computing device 900 with which embodiments of the invention may be practiced. The computing device components described below may be suitable for the computing devices described above. In a basic configuration, computing device 900 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a web browser application 720. Operating system 705, for example, may be suitable for controlling computing device 900's operation. In one embodiment, programming modules 706 may include a routing manager 242, as described above, installed on computing device 900. Furthermore, embodiments of the invention may be practiced in conjunction with a graphics library, other operating systems, or any other application program and is not limited to any particular application or system. This basic configuration is illustrated in FIG. 4 by those components within a dashed line 708.

Computing device 900 may have additional features or functionality. For example, computing device 900 may also include additional data storage devices (removable and/or non-removable) such as, for example, magnetic disks, optical disks, or tape. Such additional storage is illustrated in FIG. 4 by a removable storage 709 and a non-removable storage 710.

As stated above, a number of program modules and data files may be stored in system memory 704, including operating system 705. While executing on processing unit 702, programming modules 706, such as the routing manager may perform processes including, for example, method 300 as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 242 may be operated via application-specific logic integrated with other components of the computing device/system 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a suitable mobile computing environment, for example, a mobile telephone, a smartphone, a tablet personal computer, a laptop computer, and the like, with which embodiments of the invention may be practiced. With reference to FIG. 5A, an example mobile computing device 800 for implementing the embodiments is illustrated. In a basic configuration, mobile computing device 800 is a handheld computer having both input elements and output elements. Input elements may include touch screen display 805 and input buttons 815 that allow the user to enter information into mobile computing device 800. Mobile computing device 800 may also incorporate an optional side input element 815 allowing further user input. Optional side input element 815 may be a rotary switch, a button, or any other type of manual input element. In alternative embodiments, mobile computing device 800 may incorporate more or less input elements. For example, display 805 may not be a touch screen in some embodiments. In yet another alternative embodiment, the mobile computing device is a portable phone system, such as a cellular phone having display 805 and input buttons 815. Mobile computing device 800 may also include an optional keypad 835. Optional keypad 815 may be a physical keypad or a "soft" keypad generated on the touch screen display.

Mobile computing device 800 incorporates output elements, such as display 805, which can display a graphical user interface (GUI). Other output elements include speaker 825 and LED light 820. Additionally, mobile computing device 800 may incorporate a vibration module (not shown), which causes mobile computing device 800 to vibrate to notify the user of an event. In yet another embodiment, mobile computing device 800 may incorporate a headphone jack (not shown) for providing another means of providing output signals.

Although described herein in combination with mobile computing device 800, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 5B is a block diagram illustrating components of a mobile computing device used in one embodiment, such as the computing device shown in FIG. 5A. That is, mobile computing device 800 can incorporate system 802 to implement some embodiments. For example, system 802 can be used in implementing a "smart phone" that can run one or more applications similar to those of a desktop or notebook computer such as, for example, browser, e-mail, scheduling, instant messaging, and media player applications. In some embodiments, system 802 is integrated as a computing device, such as an integrated personal digital assistant (PDA) and wireless phone.

One or more application programs 866 may be loaded into memory 862 and run on or in association with operating system 864. Examples of application programs include phone dialer programs, e-mail programs, PIM (personal information management) programs, word processing programs, spreadsheet programs, Internet browser programs, messaging programs, and so forth. System 802 also includes non-volatile storage 868 within memory 862. Non-volatile storage 868 may be used to store persistent information that should not be lost if system 802 is powered down. Applications 866 may use and store information in non-volatile storage 868, such as e-mail or other messages used by an e-mail application, and the like. A synchronization application (not shown) may also reside on system 802 and is programmed to interact with a corresponding synchronization application resident on a host computer to keep the information stored in non-volatile storage 868 synchronized with corresponding information stored at the host computer. As should be appreciated, other applications may be loaded into memory 862 and run on the device 800, including the routing manager 242, described above.

System 802 has a power supply 870, which may be implemented as one or more batteries. Power supply 870 might further include an external power source, such as an AC adapter or a powered docking cradle that supplements or recharges the batteries.

System 802 may also include a radio 872 that performs the function of transmitting and receiving radio frequency communications. Radio 872 facilitates wireless connectivity between system 802 and the "outside world", via a communications carrier or service provider. Transmissions to and from radio 872 are conducted under control of OS 864. In other words, communications received by radio 872 may be disseminated to application programs 866 via OS 864, and vice versa.

Radio 872 allows system 802 to communicate with other computing devices, such as over a network. Radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 802 is shown with two types of notification output devices; LED 820 that can be used to provide visual notifications and an audio interface 874 that can be used with speaker 825 to provide audio notifications. These devices may be directly coupled to power supply 870 so that when activated, they remain on for a duration dictated by the notification mechanism even though processor 860 and other components might shut down for conserving battery power. LED 820 may be programmed to remain on indefinitely until the user takes action to indicate the powered-on status of the device. Audio interface 874 is used to provide audible signals to and receive audible signals from the user. For example, in addition to being coupled to speaker 825, audio interface 874 may also be coupled to a microphone 820 to receive audible input, such as to facilitate a telephone conversation. In accordance with embodiments of the present invention, the microphone 820 may also serve as an audio sensor to facilitate control of notifications, as will be described below. System 802 may further include video interface 876 that enables an operation of on-board camera 830 to record still images, video stream, and the like.

A mobile computing device implementing system 802 may have additional features or functionality. For example, the device may also include additional data storage devices (removable and/or non-removable) such as, magnetic disks, optical disks, or tape. Such additional storage is illustrated in FIG. 5B by storage 868. Computer storage media may include volatile and non-volatile, removable and non-removable media implemented in any method or technology for storage of information, such as computer readable instructions, data structures, program modules, or other data.

Data/information generated or captured by the device 800 and stored via the system 802 may be stored locally on the device 800, as described above, or the data may be stored on any number of storage media that may be accessed by the device via the radio 872 or via a wired connection between the device 800 and a separate computing device associated with the device 800, for example, a server computer in a distributed computing network such as the Internet. As should be appreciated such data/information may be accessed via the device 800 via the radio 872 or via a distributed computing network. Similarly, such data/information may be readily transferred between computing devices for storage and use according to well-known data/information transfer and storage means, including electronic mail and collaborative data/information sharing systems.

FIG. 6 illustrates a system architecture for routing requests, as described above.

Components managed via the routing manager 242 may be stored in different communication channels or other storage types. For example, components along with information from which they are developed may be stored using directory services 1022, web portals 1024, mailbox services 1026, instant messaging stores 1028 and social networking sites 1030. The systems/applications 242, 1020 may use any of these types of systems or the like for enabling management and storage of components in a store 1016. A server 1032 may provide communications for managed components and content to clients. As one example, server 1032 may be a web server providing DNS related services. Server 1032 may provide services and content over the web to clients through a network 1008. Examples of clients that may utilize server 1032 include computing device 1002, which may include any general purpose personal computer, a tablet computing device 1004 and/or mobile computing device 1006 which may include smart phones. Any of these devices may obtain display component management communications and content from the store 1016.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for Domain Name System (DNS) routing, comprising:
   receiving a first request to resolve an IP address;
   obtaining, by a DNS server, a record used in resolving the first request;
   identifying, by the DNS server, a unique label associated with the record that identifies software version information and regional information used in resolving the IP address that relates to an entity;
   determining, based on the unique label and a time of the first request, a first software version used to handle the first request and a first region used to handle the first request;
   determining a first IP address to route the first request using the unique label;
   returning a first response comprising the first IP address;
   receiving a second request to resolve the IP address;
   obtaining, by the DNS server, the record;
   identifying, by the DNS server, the unique label;
   determining, based on the unique label and a time of the second request, a second software version and a second region used to handle the second request, wherein the time of the second request is different from the time of the first request, the second software version is different from the first software version, and the second region is different from the first region;
   determining a second IP address to route the second request using the unique label; and
   returning a second response comprising the second IP address.

2. The method of claim 1, further comprising determining a region that is associated with the request using the unique label.

3. The method of claim 1, wherein the unique label is an identifier that is part of the record that remains constant regardless of the software version changing that is used to service a request from the entity.

4. The method of claim 1, wherein the record is one of: a Mail Exchanger record (MX) and an "A" record.

5. The method of claim 1, wherein the record comprises the unique label followed by a domain name of a server.

6. The method of claim 1, further comprising accessing a data store that stores the software version and a region that is associated with the entity as determined from the unique label.

7. The method of claim 1, wherein the entity is a customer that is requesting access to a messaging service.

8. A computer-readable storage device storing computer-executable instructions for routing a request, the instructions, when executed by a processor, causing a computing device to perform operations comprising:
   receiving a first request to resolve an IP address;
   obtaining, by a DNS server, a Mail Exchanger (MX) record used in resolving the first request;
   identifying, by the DNS server, a unique label associated with the MX record that identifies software version information and regional information used in resolving the IP address that relates to an entity;
   determining, based on the unique label and a time of the first request, a first software version used to handle the first request and a first region used to handle the first request;
   determining a first IP address to route the first request using the unique label;
   returning a response comprising the first IP address;
   receiving a second request to resolve the IP address;
   obtaining, by the DNS server, the MX record;
   identifying, by the DNS server, the unique label;
   determining, based on the unique label and a time of the second request, a second software version and a second region used to handle the second request, wherein the time of the second request is different from the time of the first request, the second software version is different from the first software version, and the second region is different from the first region;
   determining a second IP address to route the second request using the unique label; and
   returning a second response comprising the second IP address.

9. The computer-readable storage device of claim 8, further comprising determining a region that is associated with the request using the unique label contained within the MX record.

10. The computer-readable storage device of claim 8, wherein the unique label is an identifier that is part of the MX record that remains constant regardless of the software version changing that is used to service a request from the entity.

11. The computer-readable storage device of claim 8, wherein the MX record comprises one of: the unique label followed by a domain name of a server and an identifier referencing an externally stored unique label within the MX record.

12. The computer-readable storage device of claim 8, further comprising accessing a data store that stores the software version and a region that is associated with the entity as determined from the unique label.

13. A system for routing a request, comprising:
   a network connection that is coupled to tenants of the multi-tenant service;
   a processor and a computer-readable medium storing an operating environment, the operating environment controlling a routing manager to cause the routing manager, when executed by the processor, to perform operations comprising:
   receiving a first request to resolve an IP address;
   obtaining, by a DNS server, a record used in resolving the first request that comprises at least one of: an "A" record and an MX;
   identifying, by the DNS server, a unique label associated with the record that identifies software information and regional information used in resolving the IP address that relates to an entity;
   determining, based on the unique label and a time of the first request, a first software version used to handle the first request and a first region used to handle the first request, wherein the determining further comprises looking up a customer software version based on the unique identifier;
   determining a first IP address to route the first request using the unique label;
   returning a response comprising the first IP address;
   receiving a second request to resolve the IP address;
   obtaining, by the DNS server, the record;
   identifying, by the DNS server, the unique label;

determining, based on the unique label and a time of the second request, a second software version and a second region used to handle the second request, wherein the time of the second request is different from the time of the first request, the second software version is different from the first software version, and the second region is different from the first region;

determining a second IP address to route the second request using the unique label; and returning a second response comprising the second IP address.

14. The system of claim 13, further comprising determining a region that is associated with the request using the unique label contained within the MX record.

15. The system of claim 13, wherein the unique label is an identifier that is part of the MX record that remains constant regardless of the software version changing that is used to service a request from the entity.

16. The system of claim 13, further comprising accessing a data store that stores the software version and a region that is associated with the entity as determined from the unique label.

17. The computer-readable storage device of claim 13, wherein the record comprises the unique label followed by a domain name of the server.

18. The computer-readable storage device of claim 13, further comprising accessing a data store that stores the software version and a region that is associated with the entity as determined from the unique label.

* * * * *